United States Patent [19]

Schricker

[11] Patent Number: 5,585,553
[45] Date of Patent: Dec. 17, 1996

[54] APPARATUS AND METHOD FOR DIAGNOSING AN ENGINE USING A BOOST PRESSURE MODEL

[75] Inventor: David R. Schricker, Dunlap, Ill.

[73] Assignee: Caterpillar Inc., Peoria, Ill.

[21] Appl. No.: 508,604

[22] Filed: Jul. 28, 1995

[51] Int. Cl.$^6$ ................................................ F02B 37/12
[52] U.S. Cl. .......................................... 73/117.3; 60/611
[58] Field of Search .......................... 73/115, 116, 117.2, 73/117.3, 118.2; 60/608, 611

[56] References Cited

U.S. PATENT DOCUMENTS

| | | | |
|---|---|---|---|
| 3,721,120 | 3/1973 | Howell et al. | 73/117.3 |
| 4,030,350 | 6/1977 | Bier | 73/23.31 |
| 4,368,705 | 1/1983 | Stevenson et al. | 123/357 |
| 4,604,701 | 8/1986 | Fujawa et al. | 364/431.01 |
| 4,616,616 | 10/1986 | Staniak et al. | 123/357 |
| 4,621,335 | 11/1986 | Bluish et al. | 364/550 |
| 4,630,189 | 12/1986 | Ohmori et al. | 364/150 |
| 4,651,561 | 3/1987 | Ueno et al. | 73/115 |
| 4,671,107 | 6/1987 | Chiesa et al. | 73/118.2 |
| 4,736,715 | 4/1988 | Larsen | 123/64 |
| 4,798,083 | 1/1989 | Sogawa | 73/118.2 |
| 4,807,151 | 2/1989 | Citron | 73/118.2 |
| 4,849,897 | 7/1989 | Ciccarone | 60/611 |
| 4,882,905 | 11/1989 | Kawamura | 60/608 |
| 4,901,530 | 2/1990 | Kawamura | 60/608 |
| 4,953,110 | 8/1990 | Chartrand | 364/431.03 |
| 4,964,318 | 10/1990 | Ganoung | 74/859 |
| 4,969,332 | 11/1990 | Nancarrow et al. | 60/608 |
| 4,984,456 | 1/1991 | Takahashi | 73/118.2 |
| 5,010,487 | 4/1991 | Stonehocker | 364/424.03 |
| 5,136,517 | 8/1992 | Cullen et al. | 73/118.2 |
| 5,140,850 | 8/1992 | Ellmann et al. | 73/118.2 |
| 5,191,789 | 3/1993 | Furuya | 73/118.2 |
| 5,205,125 | 4/1993 | Potter | 60/602 |
| 5,293,553 | 3/1994 | Dudek et al. | 73/118.2 |
| 5,377,112 | 12/1994 | Brown, Jr. et al. | 364/431.12 |
| 5,423,208 | 6/1995 | Dudek et al. | 73/118.2 |

FOREIGN PATENT DOCUMENTS

| 0142101 | 5/1985 | European Pat. Off. . |
|---|---|---|
| 0231155 | 8/1987 | European Pat. Off. . |

*Primary Examiner*—Richard Chilcot
*Assistant Examiner*—George M. Dombroske
*Attorney, Agent, or Firm*—James R. Yee

[57] ABSTRACT

An apparatus and method for diagnosing an engine using a computer based model of the boost pressure of a turbocharger.

14 Claims, 3 Drawing Sheets

APPARATUS AND METHOD FOR DIAGNOSING AN ENGINE USING A BOOST PRESSURE MODEL

TECHNICAL FIELD

This invention relates generally to an apparatus and method for providing engine diagnostics, and more particularly, to an apparatus and method for diagnosing an engine using a computer based model of boost pressure.

BACKGROUND ART

Proper maintenance of a vehicle's engine is an important priority in the daily operation of a vehicle. Without proper maintenance minor problems can escalate into major mechanical failures, resulting in costly downtime and expensive repairs.

Typically, when an operator observes a performance loss or loss of power in a vehicle's engine, the vehicle is brought into the shop for testing and repair.

Unfortunately, the best time to diagnose power-related problems is during typical driving conditions. In the shop, test data may be collected using a dynamometer. However, this data is really only useful for verifying that a power problem exists. It does not necessarily locate the problem.

Therefore, the best way to diagnose the engine is by collecting data during operation and analyzing the data. Generally, this type of analysis has been confined to collecting the data and comparing the data to normal ranges or by comparing graphs of the data to standard or normal graphs. The problem with this type of method is that it does not provide on-board or real-time diagnostics. It also requires that an operator recognize a loss of power and that the vehicle is brought in for maintenance. Furthermore, it requires a great amount of skill and knowledge to equate deviations in the engine parameters to a type of problem or the location of the problem.

One proposed solution is found in U.S. Pat. No. 5,377,112 issued to Brown, Jr. et al, on Dec. 24, 1994. The Brown reference discloses a method and apparatus for providing engine diagnostics using computer based models. The disclosed models calculate modeled values of boost pressure and exhaust temperature. The models use sensor information and provide estimates of boost pressure and exhaust temperature by simulating the operation and thermal dynamics of the engine. One of the drawbacks of such an approach is that it requires a high level of computing power which is typically not found on vehicles.

The subject invention is directed at overcoming one or more of the problems as set forth above.

DISCLOSURE OF THE INVENTION

In one aspect of the present invention, an apparatus for modeling boost pressure of a turbocharger of an engine is provided. The engine includes an intake manifold. The apparatus senses turbocharger input temperature turbocharger input pressure, and intake manifold temperature and responsively determines a modeled boost pressure value using a boost pressure polynomial function.

In another aspect of the present invention, an apparatus for providing diagnostics for an engine having a turbocharger and an intake manifold by modeling boost pressure of the turbocharger is provided. The apparatus senses turbocharger input temperature, turbocharger input pressure, and intake manifold temperature and responsively determines a modeled boost pressure value using a boost pressure polynomial function. Actual boost pressure is sensed and compared with the modeled value. The engine is diagnosed using the difference between the actual and modeled values.

In a third aspect of the present invention, a method of creating a computer based model of the boost pressure of a turbocharger on an engine having an air filter and an intake manifold is provided. The method includes the steps of sensing boost pressure on a test engine and storing boost pressure values over a period of time. The method also includes the steps of determining the constants of a boost pressure polynomial function as a function of the stored boost pressure values.

In a fourth aspect of the present invention, a method for providing diagnostics of an engine having a turbocharger and an intake manifold by modeling boost pressure of the turbocharger is provided. The method includes the steps of sensing turbocharger input temperature, turbocharger input pressure, and intake manifold temperature and responsively determining a modeled boost pressure value using a boost pressure polynomial function. The modeled boost pressure value is compared with the actual boost pressure and the engine is diagnosed using the difference between the actual and modeled values.

BEST MODE FOR CARRYING OUT THE INVENTION

Figure 1:
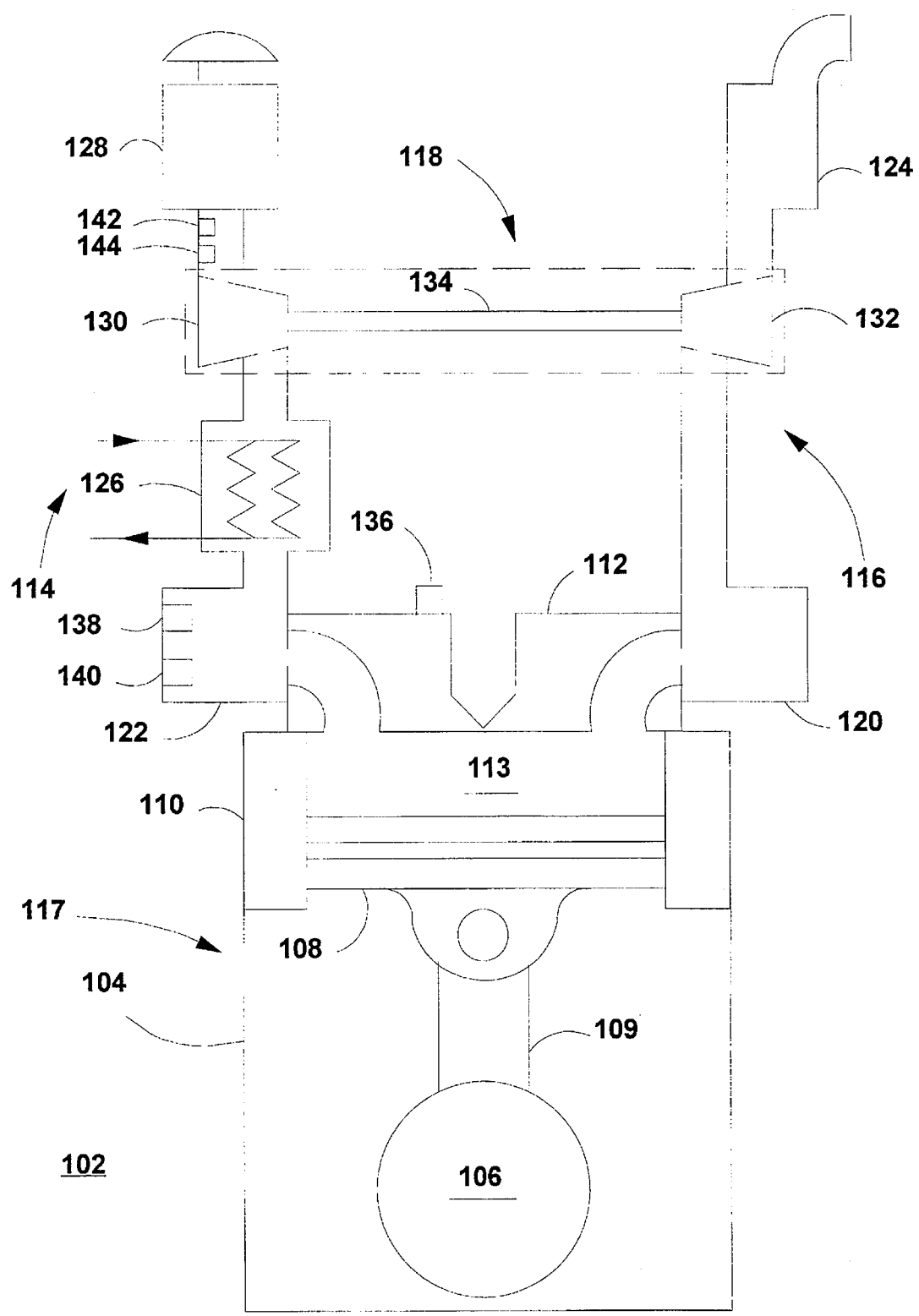
FIG. 1 is a stylized representation of an engine having a combustion system, an air intake system and an exhaust system.

With reference to FIG. 1, the present invention is adapted to diagnose an engine 102 using a computer based model of the boost pressure. As shown in the stylized representation of the engine 102, the engine 102 includes an air intake system 114, an exhaust system 116, a combustion system 117, and a turbocharger 118. The air intake system 114 includes an air filter or cleaner 128, an aftercooler 126, and an air intake manifold 122. The exhaust system 116 includes an exhaust manifold 120 and a muffler 124.

The turbocharger 118 includes a compressor 130, a turbine 132, and a shaft 134. The compressor 130 is connected into the air intake system 114 between the aftercooler 126 and the air filter 128. The turbine 132 is connected into the exhaust system 116 between the exhaust manifold 120 and the muffler 124. The shaft 134 connects the compressor 130 to the turbine 132.

The combustion system 117 includes a plurality of cylinders 104 and a crankshaft 106. Each cylinder 104 has an associated piston 108 and piston rod 109. For the purposes of illustration, only one cylinder 104, piston 108, and piston rod 109 are shown. Each cylinder 104 includes a cylinder liner 110. Each cylinder 104 may also include a cylinder head 112 or a common head arrangement may be used. The piston 108, cylinder liner 110, and cylinder head 112 form a combustion chamber 113. The cylinder head 112 forms a passageway from the air intake manifold 122 and the exhaust manifold 120 to the combustion chamber 113. The cylinder head 112 also forms a passageway, allowing a fuel delivery system to introduce fuel into the combustion chamber 113. In the preferred embodiment, fuel is injected into the combustion chamber 113 by an electronic fuel injector (not shown).

Figure 2:
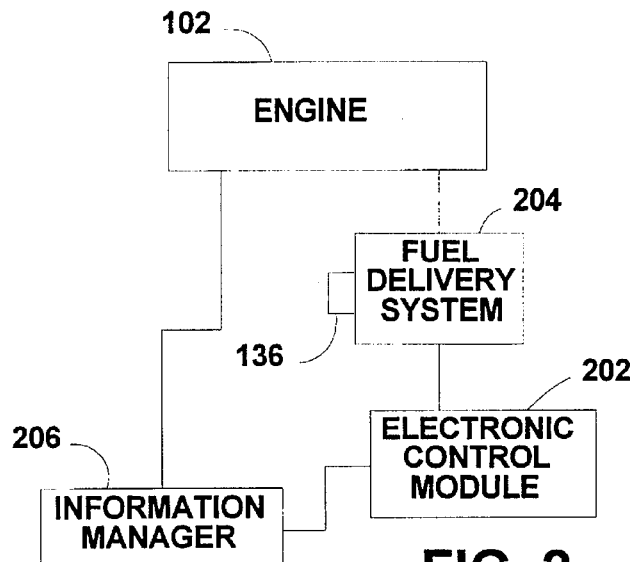
FIG. 2 is a block diagram of an apparatus for diagnosing the engine of FIG. 1, according to an embodiment of the present invention.

With reference to FIG. 2, the engine 102 is typically controlled by an electronic control module (ECM) 202. The ECM 202 includes a fuel delivery system 204. Typically, the fuel delivery system 204 includes a fuel injection system or a electronic governor. The electronic governor 204 controls the amount of fuel delivered to the engine.

An information manager 206 receives information from the ECM 202 and directly from sensors connected to the engine 102 and uses the engine information to diagnose the engine 102 (as discussed below). Preferably, the information manager 206 includes a microprocessor.

Referring to FIGS. 1 and 2, in the preferred embodiment, the information manager 206 receives information from a fuel temperature sensor 136, an intake manifold pressure (boost pressure) sensor 138, an intake manifold temperature sensor 140, a filtered air pressure sensor 142, and a filtered air temperature sensor 144. It should be noted however that some of the sensors 136–146 transmit sensor information to the ECM 202. For those sensors, the diagnostic controller 206 receives the information from the electronic control module 202.

Referring to FIGS. 1 and 2, the information manager 206 receives information from an intake manifold pressure (boost pressure) sensor 122 and an intake manifold temperature sensor 124

The ECM 202 may also transmit other sensor information and other calculated engine parameters to the information manager 206. For example, the ECM 202 calculates the mass flow rate of fuel into the engine 102 as a function of engine speed (measured) and rack position or RACK. Note that the term RACK is used for historic purposes only. In engines controlled by an ECM, there is physically no rack. However the term, rack position (RACK) has been retained to refer to the amount of fuel delivered to the engine 102. The ECM 202 relays this information to the information manager 206. In the preferred embodiment, the ECM 202 also receives sensor information relating to engine speed, timing advance, and rack position or fuel rate and relays this information to the information manager 206.

In one embodiment, the information manager 206 performs on-board diagnostic routines using a model of the boost pressure and comparing the modeled value to the actual value. In a second embodiment, the information manager 206 records or stores the sensor information in a memory for download into an external computer for analysis. In a third embodiment, the information manager 206 includes a transmitter (not shown) for transmitting the data to a remote site for processing. A satellite system receives the signals from the transmitter and relays the signals to the remote cite. One suitable transmitter is the Omnitracs Mobile Messaging Communications Terminal. A suitable satellite system service is Omnitracs Message Service. Both are available from Qualcomm of San Diego, Calif.

Figure 3:
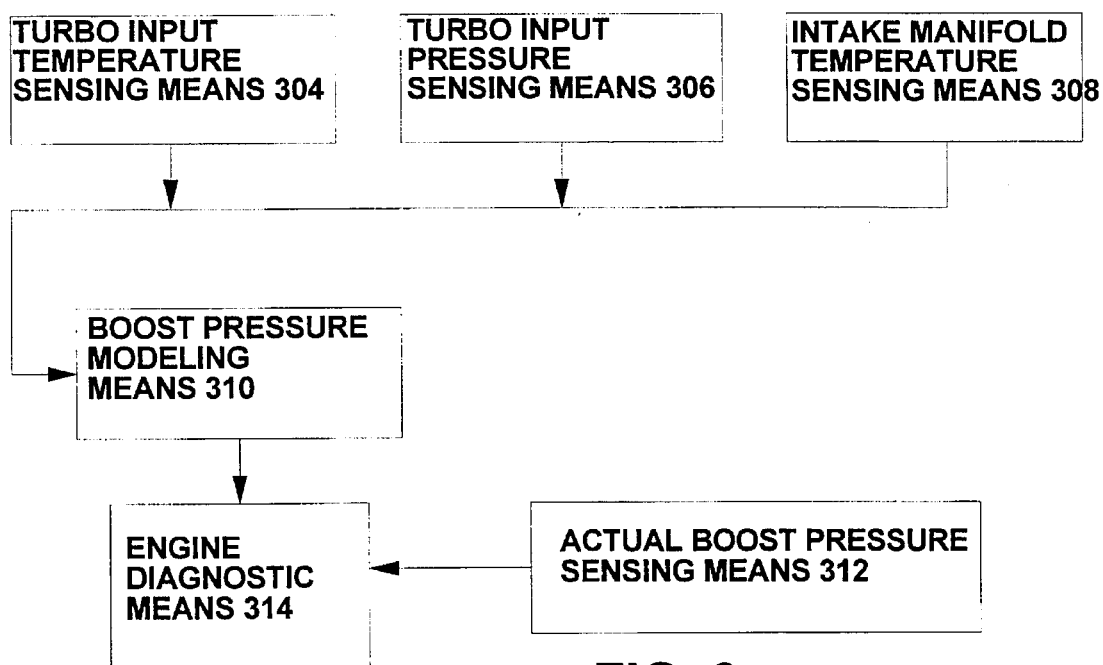
FIG. 3 is a flow diagram illustrating operation of the apparatus of FIG. 2, according to an embodiment of the present invention; and, FIG. 4 is a flow diagram illustrating a portion of the operation of the apparatus of FIG. 2, according to an embodiment of the present invention.

With reference to FIG. 3, the operation of the present invention or apparatus 302 is described.

A means 304 senses turbocharger input temperature and responsively produces a turbocharger input temperature signal ($T_{AIR\_FILTERED}$). In the preferred embodiment, the turbocharger input temperature sensing means 304 includes the filtered air temperature sensor 144.

A means 306 senses turbocharger input pressure and responsively produces a turbocharger input pressure signal ($P_{AIR\_FILTERED}$). In the preferred embodiment, the turbocharger input pressure sensing means 306 includes the filtered air pressure sensor 142.

A means 308 senses intake manifold temperature and responsively producing an intake manifold temperature signal ($T_{INTAKE}$). In the preferred embodiment, the intake manifold temperature sensing means 308 includes the intake manifold temperature sensor 140.

A means 310 for receiving the turbocharger input temperature and pressure signals and the intake manifold temperature signal and responsively determines a modeled boost pressure value using a boost pressure polynomial function. The modeled boost pressure determining means 310 also receives the other information needed for the boost pressure polynomial function, i.e., SPEED, RACK, and LOAD (see below) from other modules.

A means 312 senses actual boost pressure and responsively produces an actual boost pressure signal. In the preferred embodiment, the actual boost pressure sensing means 312 includes the intake manifold pressure sensor 138.

A means 314 receives the modeled boost pressure value and the actual boost pressure signal and responsively provides engine diagnostics.

In the preferred embodiment, the boost pressure polynomial function is:

| BOOST_PRESSURE = | | | |
|---|---|---|---|
| K0 | + (K1 | * | SPEED) |
| | + (K2 | * | RACK) |
| | + (K3 | * | LOAD) |
| | + (K4 | * | $T_{AIR\_FILTERED}$) |
| | + (K5 | * | $P_{AIR\_FILTERED}$) |
| | + (K6 | * | $T_{INTAKE}$) |
| | + (K7 | * | $(T_{AIR\_FILTERED})^2$) |
| | + (K8 | * | $(P_{AIR\_FILTERED})^2$) |
| | + (K9 | * | $(T_{INTAKE})^2$), | where, SPEED is the speed of the engine, RACK, is a measure of fuel input to the engine, LOAD is a measure of load variation, and K0–K9 are the polynomial constants.

In the preferred embodiment, the polynomial constants are derived using test data. The test data may consist of actual boost pressure values measured during operation of a test vehicle. Test data must be measured during operation which fairly represents the environmental and application requirements of the engine for which the constants are being derived. Alternately, the test data may consist of boost pressure values derived from a simulation of the engine.

In the preferred embodiment, the polynomial constants are derived using a regression method based on least squares. However, any suitable method may be used.

Engine diagnostics may be performed in several ways. In one embodiment, the engine is diagnosed by comparing the actual boost pressure value and the modeled value and determining the difference. The difference is then compared with a preset limit. If the difference exceeds the preset limit, appropriate action may taken. For example, a warning lamp might be lit which would signal the operator of a warning condition. A warning may also be stored with the data for analysis later or transmitted to a diagnostic center.

Additionally, the boost pressure model may be combined with a computer based model of another parameter, e.g., exhaust temperature, of the engine. By analyzing the differences between the modeled values and the actual measured values for both parameters, the engine may be further diagnosed. For a discussion of such a system, see U.S. Pat. No. 5,377,112, issued to Brown, Jr, et al, on Dec. 24, 1994.

Figure 4:
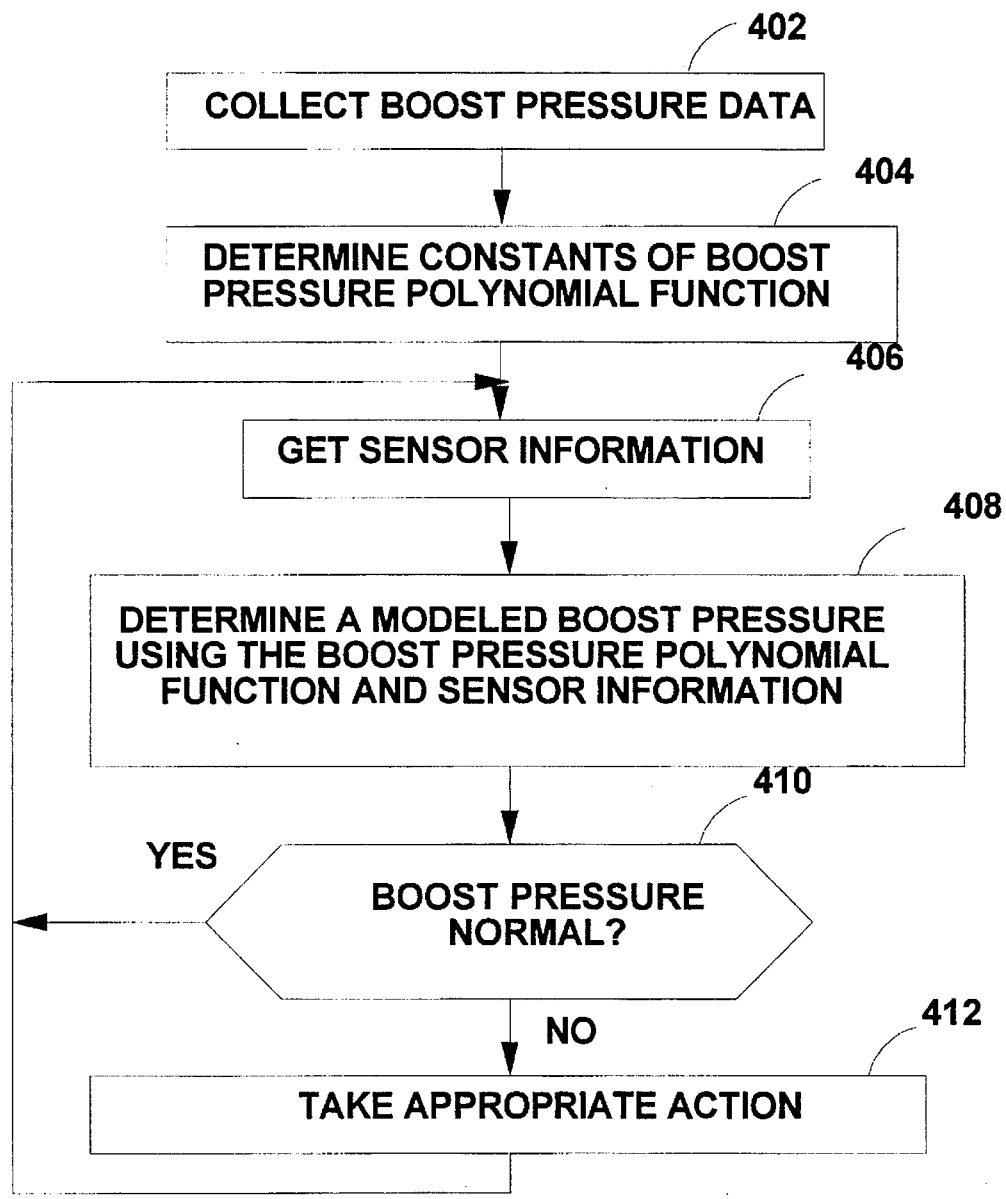

With reference to FIG. 4, the operation of the present invention is discussed. In a first control block 402, the boost pressure data or test data is collected.

In a second control block 404, the boost pressure polynomial constants are determined. In a third control block 406, the sensor information from the engine 102 is retrieved. This may be done onboard or off-board. It should be noted that not all of the sensor information is used. The sensor information that is used is referred to as trapped data. In the preferred embodiment, trapping occurs under the following conditions:

engine speed within predefined window;
coolant temperature above predefined threshold; and
RACK above predefined threshold.

Additionally, all of the above conditions must exist for a predetermined period of time, for example, six seconds.

In a fourth control block 408, the boost pressure polynomial is used to determine a modeled value of the boost pressure. In a first decision block 410, the data is analyzed to determine if the boost pressure is normal. If the boost pressure is not normal then appropriate action is taken as discussed above. Control then returns to the third control block 406 to repeat the process.

Industrial Applicability

With reference to the drawings and in operation, the present invention or apparatus 200 is adapted to provide engine diagnostics using a boost pressure model. The apparatus is embodied in a computer program. Ideally, the present invention is run on an on-board computer for real-time diagnostics. However, the present invention may be run using offloaded or downloaded data.

The apparatus receives sensor information from a plurality of sensors and/or from other modules. As described above, the sensor information is used to model boost pressure. Actual boost pressure is measured and the two are compared. The difference is used in diagnosing the engine.

One method of providing diagnostics is by comparing the difference between the actual and modeled values with a preset limit. If the difference exceeds the preset limit, the driver or operator can be notified via an on-board indicator such a lamp. Then, appropriate action such as servicing can be scheduled. Alternately, the stored data can be used in conjunction with reports from the driver of abnormalities in the engine's operation. A review of the stored data and the operator's description of the problem may be useful in identifying the source of the problem.

Other aspects, objects, and advantages of this invention can be obtained from a study of the drawings, the disclosure, and the appended claims.

I claim:

1. An apparatus for modeling boost pressure of a turbocharger of an engine, the engine having an intake manifold, including:

means for sensing turbocharger input temperature and responsively producing a turbocharger input temperature signal;

means for sensing turbocharger input pressure and responsively producing an turbocharger input pressure signal;

means for sensing intake manifold temperature and responsively producing an intake manifold temperature signal; and, means for receiving said turbocharger input temperature and pressure signals and said intake manifold temperature signal and responsively determining a modeled boost pressure value using a boost pressure polynomial function, said turbocharger input temperature and pressure signals and said intake manifold temperature signal being inputs to said boost pressure polynomial function.

2. An apparatus, as set forth in claim 1, including:

means for sensing actual boost pressure and responsively producing an actual boost pressure signal; and means for receiving said modeled boost pressure value and said actual boost pressure signal and responsively providing engine diagnostics.

3. An apparatus, as set forth in claim 2, wherein said engine diagnostics providing means includes means for comparing said modeled boost pressure value and said actual boost pressure signal and responsively producing an difference signal and means for comparing said difference signal to a preset limit.

4. An apparatus, as set forth in claim 1, wherein said boost pressure polynomial function is:

| BOOST_PRESSURE = | | | |
|---|---|---|---|
| K0 | + | (K1 * | SPEED) |
| | + | (K2 * | RACK) |
| | + | (K3 * | LOAD) |
| | + | (K4 * | TAIR_FILTERED) |
| | + | (K5 * | PAIR_FILTERED) |
| | + | (K6 * | TINTAKE) |
| | + | (K7 * | (TAIR_FILTERED)$^2$ |
| | + | (K8 * | (PAIR_FILTERED)$^2$ |
| | + | (K9 * | (TINTAKE)$^2$, | where, SPEED is the speed of the engine, RACK, is a measure of fuel input to the engine, LOAD is a measure of load variation, TAIR_FILTERED, is the temperature of air after the air filter, PAIR_FILTERED is the pressure of air after the air filter, TINTAKE is the air temperature at the intake manifold and K0–K9 are the polynomial constants.

5. An apparatus for providing diagnostics for an engine having a turbocharger and an intake manifold by modeling boost pressure of the turbocharger, including:

means for sensing turbocharger input temperature and responsively producing a turbocharger input temperature signal;

means for sensing turbocharger input pressure and responsively producing an turbocharger input pressure signal;

means for sensing intake manifold temperature and responsively producing an intake manifold temperature signal;

means for receiving said turbocharger input temperature and pressure signals and said intake manifold temperature signal and responsively determining a modeled boost pressure value using a boost pressure polynomial function, said turbocharger input temperature and pressure signals and said intake manifold temperature signal being inputs to said boost pressure polynomial function;

means for sensing actual boost pressure and responsively producing an actual boost pressure signal; and means for receiving said modeled boost pressure value and said actual boost pressure signal and responsively providing engine diagnostics.

6. An apparatus, as set forth in claim 5, wherein said engine diagnostics providing means includes means for comparing said modeled boost pressure value and said actual boost pressure signal and responsively producing an difference signal and means for comparing said difference signal to a preset limit.

7. An apparatus, as set forth in claim 6, wherein said engine diagnostics providing means includes means for capturing said difference signal and storing said difference signal over time.

8. A method of creating a computer based model of the boost pressure of a turbocharger on an engine having an air filter and an intake manifold, including the steps of:

sensing boost pressure on a test engine and responsively producing boost pressure values over a period of time;

storing said boost pressure values; and determining respective values for the constants of a boost pressure polynomial function as a function of said stored boost pressure values, wherein said boost pressure polynomial function is:

$$\begin{aligned}
\text{BOOST\_PRESSURE} = \\
K0 &+ (K1 * \text{SPEED}) \\
&+ (K2 * \text{RACK}) \\
&+ (K3 * \text{LOAD}) \\
&+ (K4 * \text{TAIR\_FILTERED}) \\
&+ (K5 * \text{PAIR\_FILTERED}) \\
&+ (K6 * \text{TINTAKE}) \\
&+ (K7 * (\text{TAIR\_FILTERED})^2) \\
&+ (K8 * (\text{PAIR\_FILTERED})^2) \\
&+ (K9 * (\text{TINTAKE})^2),
\end{aligned}$$

where, SPEED is the speed of the engine, RACK, is a measure of fuel input to the engine, LOAD is a measure of load variation, TAIR_FILTERED, is the temperature of air after the air filter, PAIR_FILTERED is the pressure of air after the air filter, TINTAKE is the air temperature at the intake manifold and K0–K9 are the polynomial constants.

9. A method, as set forth in claim 8, wherein said step of determining respective values uses a regression method based on least square error.

10. A method for providing diagnostics of an engine having a turbocharger and an intake manifold by modeling boost pressure of the turbocharger, including:

sensing turbocharger input temperature and responsively producing a turbocharger input temperature signal;

sensing turbocharger input pressure and responsively producing a turbocharger input pressure signal;

sensing intake manifold temperature and responsively producing an intake manifold temperature signal;

receiving said turbocharger input pressure and temperature signals and said intake manifold temperature signal and responsively determining a modeled boost pressure value using a boost pressure polynomial function, said turbocharger input temperature and pressure signals and said intake manifold temperature signal being inputs to said boost pressure polynomial function;

sensing actual boost pressure and responsively producing an actual boost pressure signal; and, receiving said modeled boost pressure value and said actual boost pressure signal, comparing the model boost pressure value and said actual boost pressure signal, and responsively providing engine diagnostics.

11. A method, as set forth in claim 10, including the steps of determining a difference signal between said model boost pressure value and said actual boost pressure signal.

12. A method, as set forth in claim 11, including the step of storing said difference signal over time.

13. A method, as set forth in claim 11, wherein said step of providing engine diagnostics includes the steps of:

comparing said difference signal to a preset limit; and, signaling an error when said difference signal exceeds said preset limit.

14. A method, as set forth in claim 10, wherein said boost pressure polynomial function is:

$$\begin{aligned}
\text{BOOST\_PRESSURE} = \\
K0 &+ (K1 * \text{SPEED}) \\
&+ (K2 * \text{RACK}) \\
&+ (K3 * \text{LOAD}) \\
&+ (K4 * \text{TAIR\_FILTERED}) \\
&+ (K5 * \text{PAIR\_FILTERED}) \\
&+ (K6 * \text{TINTAKE}) \\
&+ (K7 * (\text{TAIR\_FILTERED})^2) \\
&+ (K8 * (\text{PAIR\_FILTERED})^2) \\
&+ (K9 * (\text{TINTAKE})^2),
\end{aligned}$$

where, SPEED is the speed of the engine, RACK, is a measure of fuel input to the engine, LOAD is a measure of load variation, TAIR_FILTERED, is the temperature of air after the air filter, PAIR_FILTERED is the pressure of air after the air filter, TINTAKE is the air temperature at the intake manifold and K0–K9 are the polynomial constants.

* * * * *